US006277224B1

(12) United States Patent
Muesch et al.

(10) Patent No.: US 6,277,224 B1
(45) Date of Patent: Aug. 21, 2001

(54) ULTRASONIC PERFORATOR AND A METHOD FOR PERFORMING AN ULTRASONIC PERFORATION

(76) Inventors: Edward Muesch, 1428 Summit Ave., Toms River, NJ (US) 08753; Charles Lee Adams, 21 Olden Dr., Flemington, NJ (US) 08822; Angela Chaney, 175 Orchard Creek Dr., Athens, GA (US) 30606; James Meizanis, 50 Brookside Ave., Apt. 2B, Sommerville, NJ (US) 08876; Robert Kapalo, 159 Black River Rd., Long Valley, NJ (US) 07853

( * ) Notice: Subject to any disclaimer, the term of this patent is extended or adjusted under 35 U.S.C. 154(b) by 0 days.

(21) Appl. No.: 09/471,976

(22) Filed: Dec. 23, 1999

(51) Int. Cl.[7] ...................................................... B32B 31/18

(52) U.S. Cl. ........................... 156/73.3; 156/64; 156/229; 156/253; 156/351; 156/359; 156/494; 156/498; 156/555; 156/580.2

(58) Field of Search ........................... 156/64, 73.1, 73.3, 156/184, 229, 230, 238, 252, 253, 351, 359, 494, 498, 555, 580.1, 580.2; 264/442, 443, 444

(56) References Cited

U.S. PATENT DOCUMENTS

| | | | | |
|---|---|---|---|---|
| 4,747,895 | * | 5/1988 | Wallerstein et al. | 156/73.3 |
| 5,230,761 | * | 7/1993 | Crawford | 156/73.3 |
| 5,735,984 | * | 4/1998 | Hoff et al. | 156/73.3 |
| 5,879,493 | * | 3/1999 | Johnson et al. | 156/73.3 |
| 5,879,494 | * | 3/1999 | Hoff et al. | 156/73.3 |

* cited by examiner

*Primary Examiner*—James Sells

(57) ABSTRACT

The invention includes of a system and method of ultrasonically perforating adhesive bandage backings. The invention eliminates the gap between the ultrasonic horn and the pin roll, and provides for a wear resistant release coating on the pin roll. Further, the method and system disclose cooling the ultrasonic horn with a forced air stream, and provide for a pre- or post-nip roll to control the tension of the continuous web of backing. The web of backing is kept under tension with a nip roll, and passes between an ultrasonic horn and an immediately adjacent pin roll for perforation by the ultrasonic horn. The resulting material of the web backing is smoother, and has better hole quality than that seen in the prior art.

67 Claims, 13 Drawing Sheets

ULTRASONIC PERFORATOR AND A METHOD FOR PERFORMING AN ULTRASONIC PERFORATION

FIELD OF THE INVENTION

The invention relates to an ultrasonic method and system for continuously perforating a continuous strip of material, and more particularly to an ultrasonic perforator and a method of performing an ultrasonic perforation.

BACKGROUND OF THE INVENTION

Perforations in continuous material are required in a variety of manufacturing processes. In particular, adhesive bandages are uncomfortable to the bandage user unless there are perforations through the bandages to allow access to some ambient air, called "breathing". The number of perforations in the material, as well as the diameter of each perforation in the material, contribute to the air flow rate through material in cubic feet per minute per square foot. This air flow rate is referred to as porosity. Initially, mechanical punches were used to perforate the web of materials for adhesive bandages. Mechanical punches are limited to slower web speeds. Additionally, these punches required a great deal of maintenance for operation. The most crucial problem with the mechanical punches is the risk that the pins of the punches would break and lodge in the web, possibly injuring the bandage user.

Hot pin perforation is also known in the prior art. The limitations of hot pin perforation are numerous, including slow web speed, poor (non-circular) hole formation with raised rings of melted material around each hole, rough texture of the web due to the raised rings and the inefficient application of heat to the entire surface of the material. The results of hot pin perforations are marginal when foam is employed in the web.

Ultrasonic perforation is also employed in the prior art. The prior art ultrasonic systems employ ultrasonic equipment adjacent to a pin roll with a fixed gap of space in the path of the web between the ultrasonic equipment and the pin roll. This gap is created by the placement of a stop that limits movement of the ultrasonic equipment toward the pin roll. This fixed gap results in changes in the perforations over time due to the fact that the gap changes when the ultrasonic equipment is heated by use, and yields higher porosity as the temperature of the ultrasonic horn increases. The prior art also requires precise machining of the pin roll to an exact concentricity to avoid changes in the gap, and thus in the perforations, due to unevenness in the pin roll, and the repeated calibration of the ultrasonic equipment's position relative to the pin roll to maintain the fixed gap and thereby avoid changes in the perforations.

Thus, there exists a need for a web perforation system that offers high speeds, improved perforation quality control, and lower risk of injury to the ultimate user.

SUMMARY OF THE INVENTION

The invention has been developed for the perforation of a continuous web of materials in patterns, including custom designed patterns, with the advantages of high speed operation, well defined holes, smooth texture in the resulting perforated materials, the elimination of heating system problems, and a less expensive cost of operation.

The system includes a nip roll for providing tension to the web, a pin roll constructed of unhardened steel and a wear resistant coating, and an ultrasonic horn, which is cooled by a stream of forced air. The ultrasonic horn and pin roll are preferably positioned so that there is no gap between the two, and no calibration or extremely precise machining of the pin roll is required. The method of the invention includes holding the web in tension, perforating the web with ultrasonic equipment which is immediately adjacent to a pin roll, and cooling the ultrasonic equipment with a forced stream of air. The resulting material has well defined holes without abnormal tearing, and has a smooth surface with no raised annular edges around the holes.

The material to be perforated may have one or several compositions, such as wovens, non-wovens, or paper. A carrier construction web consists of an adhesive layer topped by a layer of film or foam and finally topped by carrier paper. An interliner construction web consists of a layer of film or foam topped by a layer of adhesive and finally topped by an interliner paper. The material may also be non-adhesive coated, non-laminated film or foam materials. These films, and the materials from which they are constructed, are well known in the art. Most preferably, the ultrasonic system for perforating a tensioned web having a top surface and a bottom surface includes a pin roll, having a plurality of perforators thereon, at least one ultrasonic emitter having an outlet that contacts and exerts a pressure on the tensioned web, at least one actuator that forces the ultrasonic emitter toward the tensioned web and maintains contact between the outlet and the tensioned web by exerting the pressure only on the tensioned web, and a nip roll that tangentially contacts the pin roll. The ultrasonic system for perforating a tensioned web may also include a forced air source that directs forced air onto the outlet, and a feedback controller that allows the outlet to reach a predetermined temperature, and then maintains that temperature by alternately activating and deactivating the forced air source.

BRIEF DESCRIPTION OF THE DRAWINGS

For the present invention to be clearly understood and readily practiced, the present invention will be described in conjunction with the following figures, wherein.

DESCRIPTION OF THE PREFERRED EMBODIMENTS

It is to be understood that the figures and descriptions of the present invention have been simplified to illustrate elements that are relevant for a clear understanding of the present invention, while eliminating, for purposes of clarity, many other elements found in a typical perforation system. Those of ordinary skill in the art will recognize other elements which are necessary and/or desirable for implementing the present invention. However, because such elements are well known in the art, and because they do not facilitate a better understanding of the present invention, a discussion of such elements is not provided herein.

The present invention improves the ultrasonic perforation of web materials, which are comprised of carrier construction, interliner construction, adhesive coated, non-adhesive coated, non-laminated film materials, or non-adhesive coated, non-laminated foam materials. In the preferred embodiment, the web material is used for adhesive bandage backings.

Figure 2:
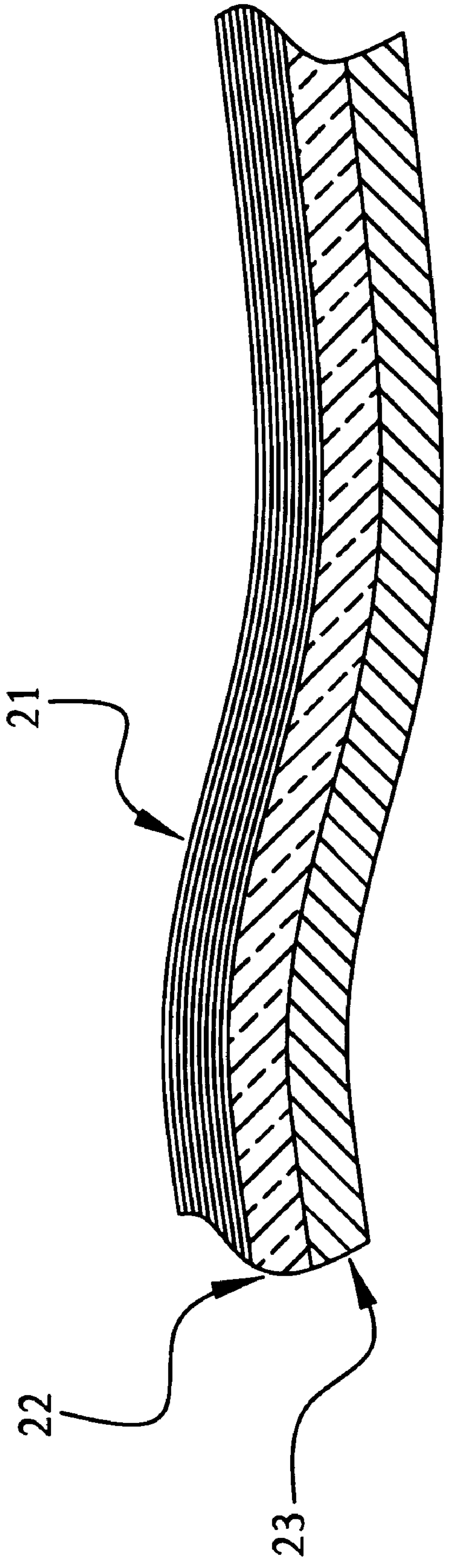
FIG. 2 displays one embodiment of the web material used in carrier construction.

The carrier construction, shown in FIG. 2, has a layer of adhesive 21, a layer of film or foam 22, and a layer of carrier paper 23. In a preferred embodiment, the layer of film or foam is used as the backing which attaches to the skin when the web is used as a bandage, and the layer of carrier paper is removed before the web is employed as a bandage. The backing film is preferably composed of vinyl, plastic, polyethylene or similar material, and the carrier paper is preferably a silicone treated, 1# to 75# basis weight paper.

Figure 3:
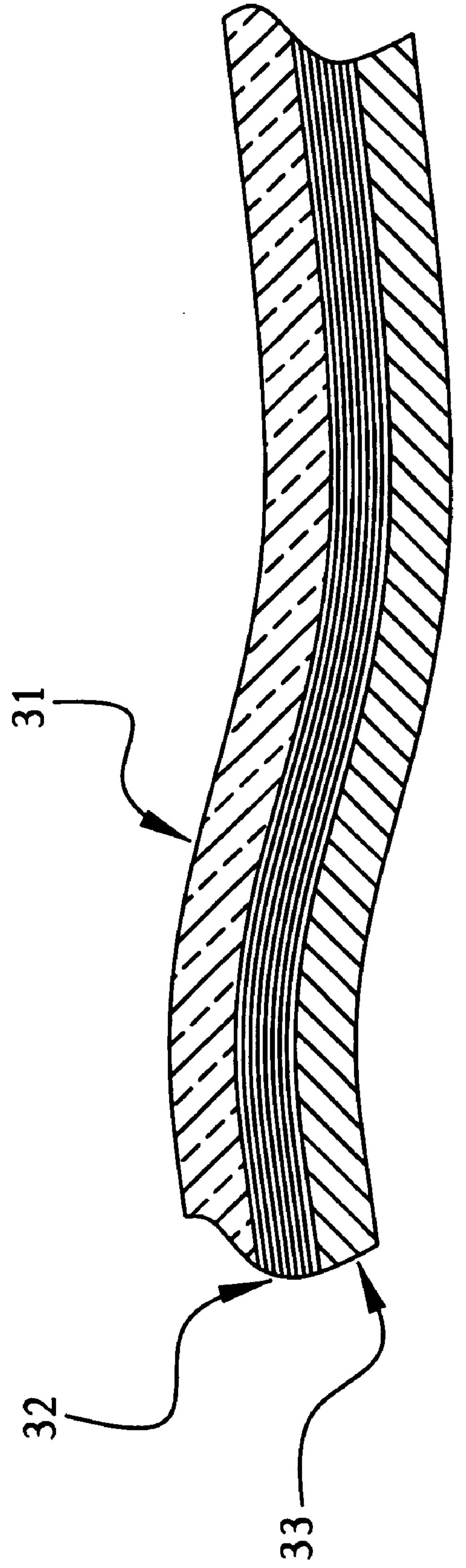
FIG. 3 displays one embodiment of the web material used in interliner construction.
Figure 4:
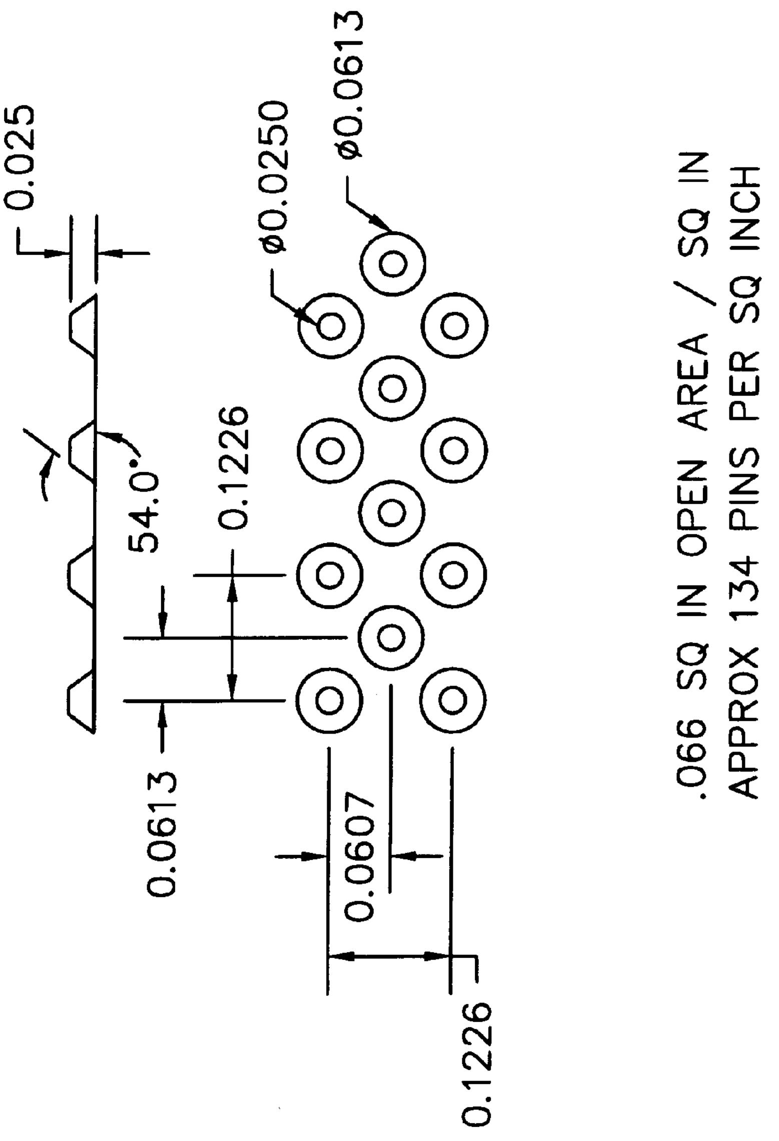
FIG. 4 shows one embodiment of a pattern of 0.025" diameter pins on the pin roll.
Figure 5:
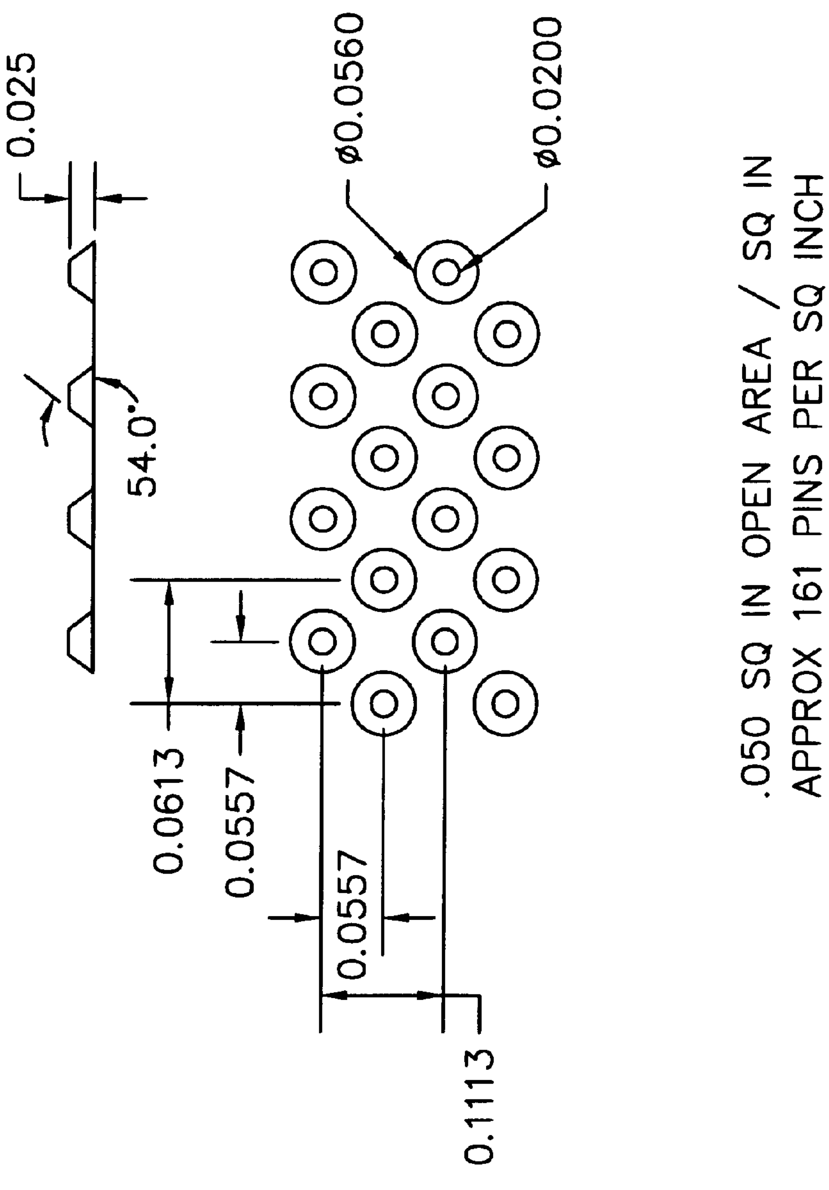
FIG. 5 shows one embodiment of a pattern of 0.02" diameter pins on the pin roll.
Figure 6:
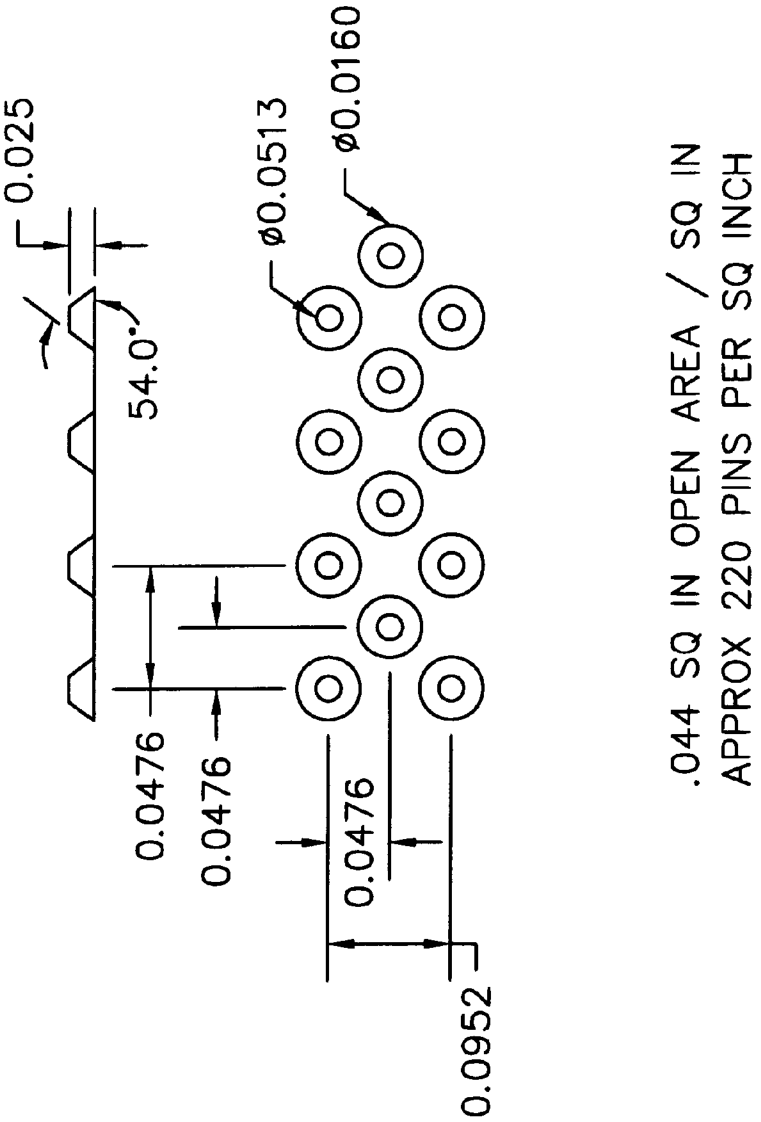
FIG. 6 shows one embodiment of a pattern of 0.016" diameter pins on the pin roll.
Figure 7:
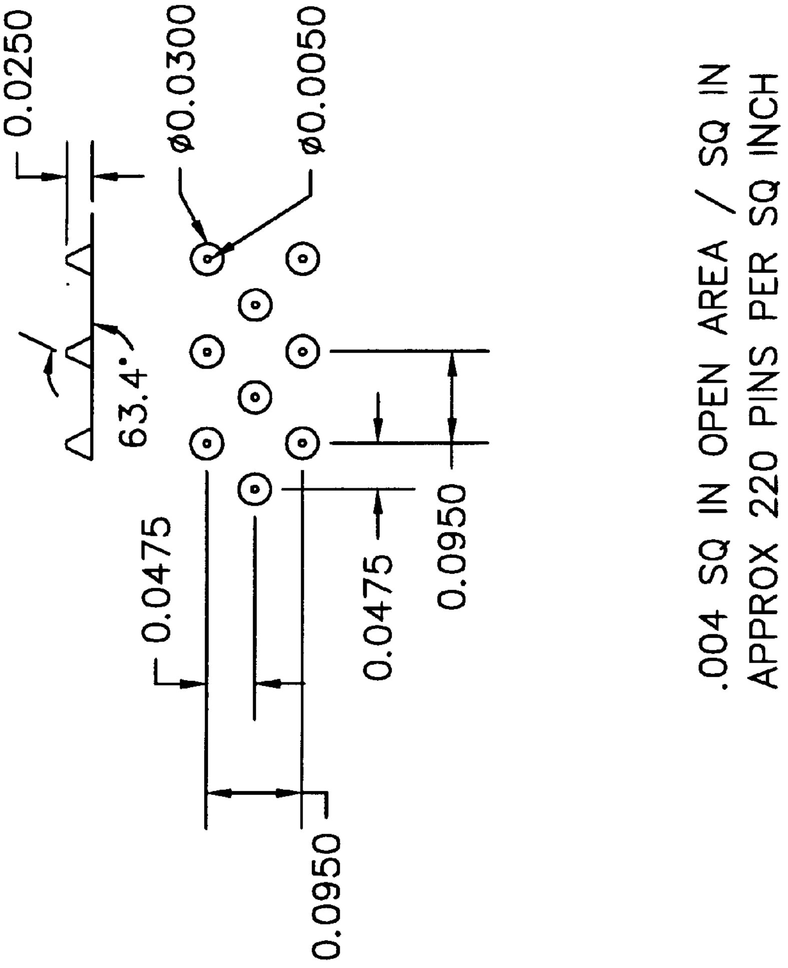
FIG. 7 shows one embodiment of a pin pattern on a pin roll.
Figure 8:
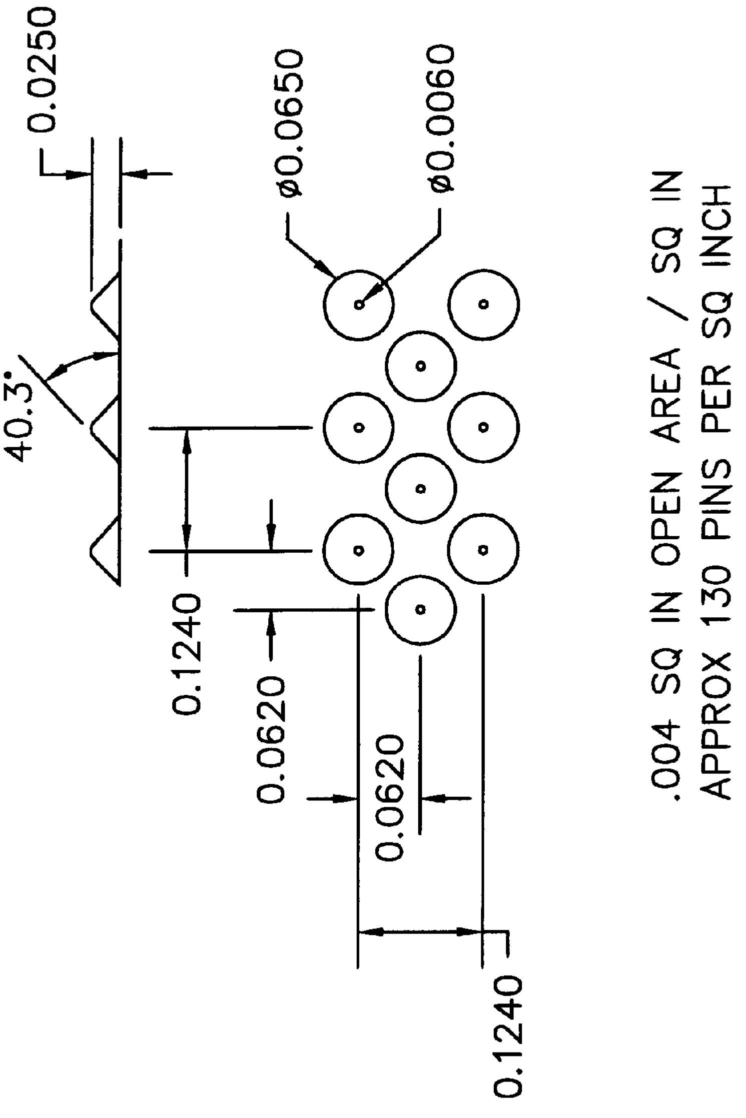
FIG. 8 shows a second embodiment of a pin pattern on a pin roll.
Figure 9:
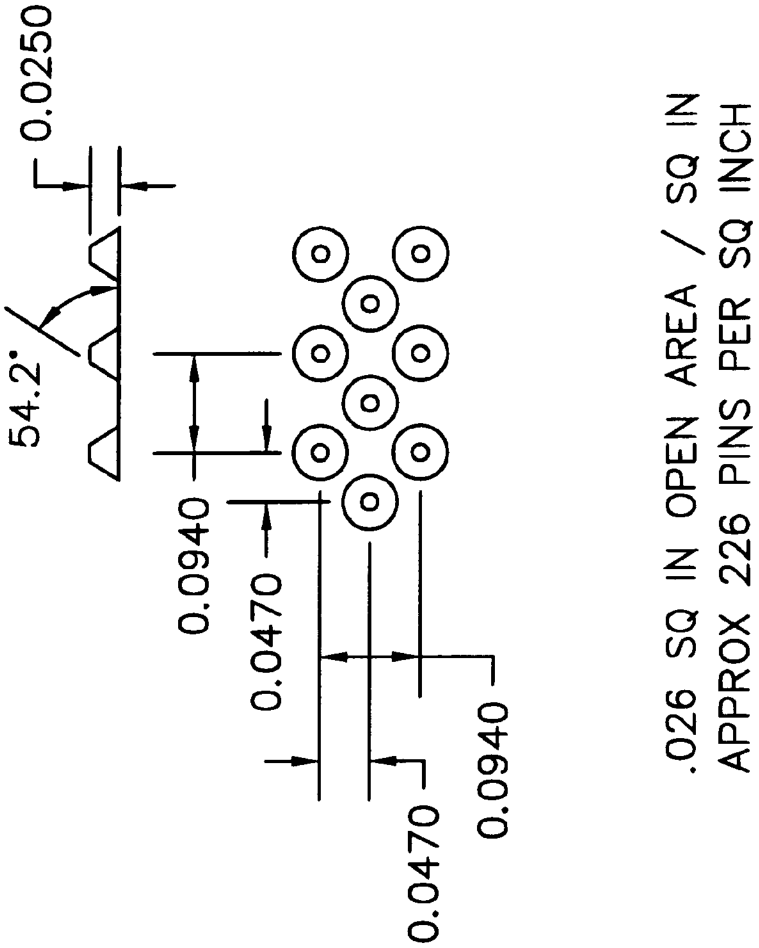
FIG. 9 shows a third embodiment of a pin pattern on a pin roll.

The interliner construction, shown in FIG. 3, has a layer of film or foam 31, a layer of adhesive 32 and a layer of interliner paper 33. In a preferred embodiment, the layer of film or foam is used as the backing when the web is used as a bandage, and the layer of interliner paper is removed before the web is employed as a bandage. The backing film is preferably composed of vinyl, plastic, polyethylene or similar material, and the interliner paper is preferably composed of a silicone treated 1# to 75# basis weight paper.

Figure 1A:
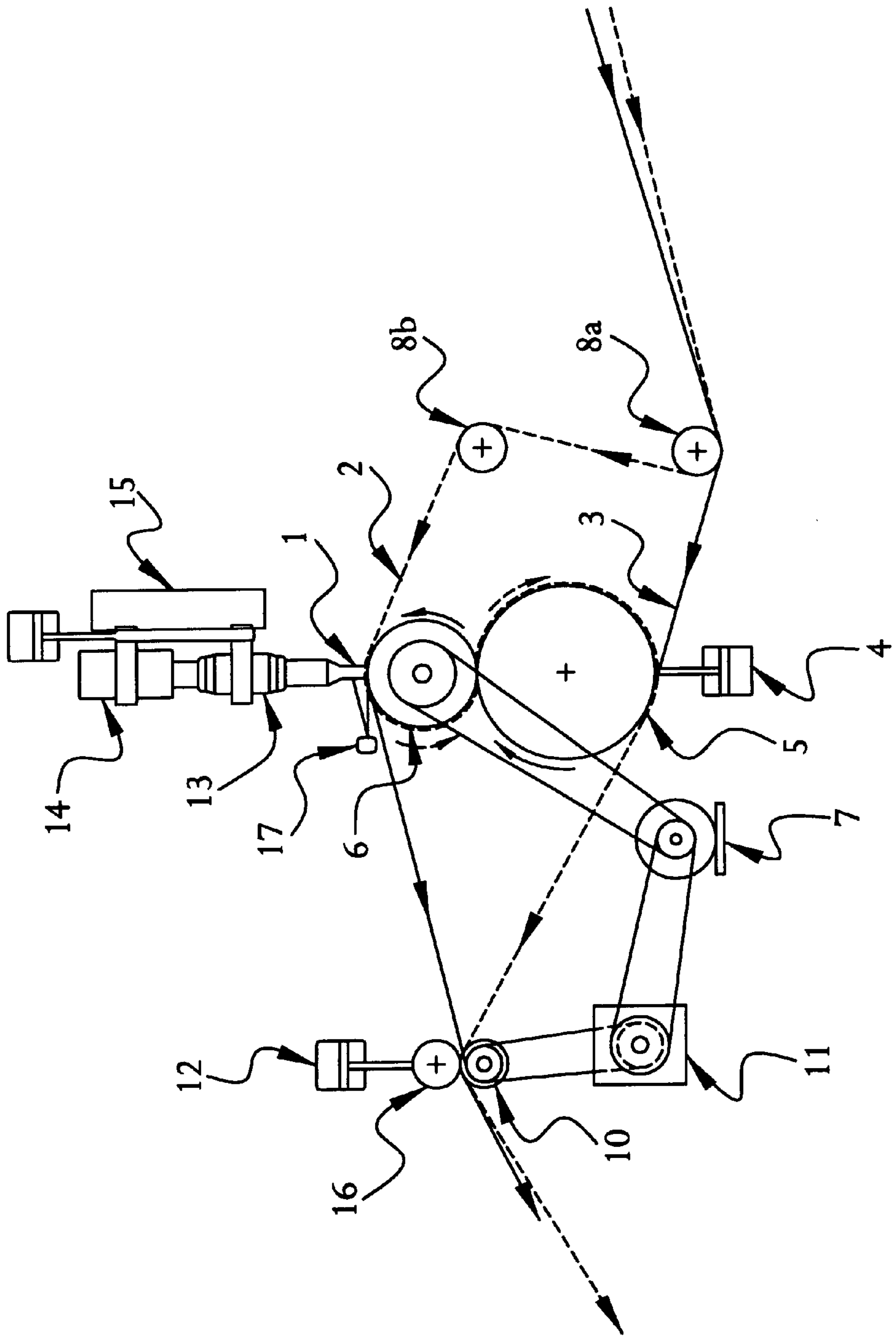
FIG. 1A shows one embodiment of the ultrasonic perforation process with the web path denoted for both the pre- and post- nip paths.

A preferred embodiment of the invention is depicted in FIG. 1A. Two distinct web paths are depicted by web 2 which follows the post-nip path and web 3 which follows the pre-nip path. Post-nip path means the web 2 contacts the nip roll 5 after contacting the ultrasonic equipment 1, and pre-nip path means the web 3 contacts the nip roll 5 before contacting the ultrasonic equipment 1. Either construction (interliner or carrier) can be run in either path (pre-nip or post nip). Generally, the post-nip path is preferred for both the interliner construction and the carrier construction.

Carrier Construction Web in the Post-nip Path

Referring now to FIG. 1A, the webs employ path 2 in a preferred embodiment. The webs used in the post-nip path are preferably of carrier construction (see FIG. 2). The web 2 is fed off of a conventional unwind under controlled tension and is directed by one or more idle rollers 8*a*, 8*b* to the perforating station 18. The perforating station 18 includes a driven pin roll 6, a pin roll drive motor 7, a nip roll 5, air cylinders 4, 12, ultrasonic equipment 1, 13, 14, 15, a driven nip roll 10, and a non-driver nip roll 16.

The pin roll 6, is knurled or engraved with a pattern of truncated conical projections, or pins 41, 51, 61, 71, 81, 91. The height and diameter of the pins will vary depending on the thickness of the film. For a thin film, the pins are generally about 0.025" high, with a diameter of the top of the pins preferably in the range of 0.005" to about 0.025". FIGS. 4, 5, 6, 7, 8, and 9 show preferred patterns of pin arrangements on the pin roll 6, which mirror the perforation patterns created in the web 2. The number of pins per square inch of pin roll 6 surface area will depend on the material used, and, for a thin film, the number of pins per square inch may range preferably from about 5 to about 500, and more preferably from 70 to 300, and most preferably between 110 to 230. The pins on the pin roll, in the preferred embodiment, have a height greater than the height of the web as measured from the pin roll 6 toward the horn 1. The pin roll 6 is preferably an unhardened material, such as steel, which may be coated with a wear resistant coating having release properties. The carrier construction web 2 (see FIG. 2) is oriented so that the adhesive layer is in contact with the pin roll 6 and the carrier paper is in contact with the ultrasonic equipment 1. The release properties of the coating on the pin roll prevent the adhesive layer from becoming stuck to the pin roll 6. The coating is, in a preferred embodiment, a chrome-carbide ceramic metal (cermet), applied to the pin roll 6 with a High Velocity Oxygen Fuel process, followed with a silicone post treatment and cure.

The pin roll 6 is driven by a drive motor 7. In a preferred embodiment, the drive motor 7 is driven by an electronic variable speed drive system (not shown). The drive motor 7 is preset to maintain a constant pin roll 6 speed.

In a preferred embodiment, the web 2 exits one or more idle rollers 8*a*, 8*b* and wraps around the pin roll 6, passing under the ultrasonic horn 1. The ultrasonic horn is positioned so that the ultrasonic horn 1 is immediately adjacent to the pin roll 6. There is no fixed gap between the ultrasonic horn 1 and the pin roll 6, and no mechanical stop to prevent the horn 1 from contacting the pin roll 6. The horn 1 does not come into direct contact with any adhesive on the material. The ultrasonic horn 1 may be a carbide tipped titanium horn. A booster 13 and converter 14 are used in connection with the ultrasonic horn 1, forming the ultrasonic stack. An air actuator 15 is affixed to the ultrasonic stack. Air actuator 15 causes the ultrasonic horn 1 to fully contact one side of the web 2, and the pin roll 6 to fully contact the other side of the web 2. Air actuator 15 also causes the ultrasonic horn 1 to fully contact the pin roll 6 when the web 2 is not present.

The air pressure in the air loaded actuator 15 and the amplitude of the ultrasonic generator can be varied 50–100%, from 2.5 bs/inch of width to 150 lbs/inch of width to generate the holes formed in the adhesive 21 and film or foam layer 22 of the carrier construction. These holes may be formed without completely penetrating the carrier paper 23. In a preferred embodiment, the horn loads applied by air actuator 15 to the web are preferably from 20 lbs/inch of width to 60 lbs/inch of width.

The ultrasonic stack is driven by a conventional ultrasonic generator.

In a preferred embodiment, the ultrasonic equipment has an adjustable amplitude and a maximum power input of 2000 to 2500 watts, and operates at or near a frequency of 20 kHz, although other commercially available units could be used in the present application with operating ranges from 15 kHz (audible frequency) to 40 kHz, and other applications could use units with operating ranges up to 400 kHz. The maximum power and frequency may optionally be increased over these limits depending on equipment used. The ultrasonic horn preferably imparts a localized heating to soften and melt the material at the tip of the pins on the pin roll producing a pattern of holes which match the pin pattern on the pin roll.

The need for a precise fixed gap between the horn 1 and pin roll 6 is eliminated by providing the air actuator 15 which controls the placement of the horn. The movement of the horn 1 toward or away from the pin roll 6 is controlled only by the air actuator 15, and gravity in an embodiment wherein the horn 1 is vertical to the ground, and is not limited by a stop as in the prior art. The horn 1 is forced toward the pin roll 6, and is in contact with the pin roll 6 when there is no material wound around the pin roll 6. When material is wrapped around the pin roll 6, the horn 1 is forced, by both the air actuator 15 and gravity, into contact with the material. The force with which the horn 1 is forced onto the material is dependent on the type of material, and the perforation desired. Table I shows some examples of the types of materials used with the present invention, and the force with which they are pressed into contact with the horn 1. Additionally, the horn 1 is controlled for amplitude and vibration, as well as force toward the material. Excessive horn force, amplitude, or vibration provides undesired stress to the system components. Thus, the horn is maintained to provide only enough force, amplitude, and vibration to provide the desired web porosity.

The air actuator 15 discussed herein is exemplary only. Any type of actuator 15 known in the art, such as a hydraulic or spring actuator, may be used in the present invention to urge the horn toward the material. Additionally, because the force toward the material of the horn maintains a contact with the material, the present invention does not require any active variation of the gap, but rather maintains the contact through passive variations.

There are several benefits to the elimination of the fixed gap in the prior art, in addition to the elimination of the need for a stop. First, the calibration and precision mechanism required to set and maintain such a gap is eliminated. The prior art necessitated, in order to maintain proper perforation, that the gap be maintained at a distance slightly smaller than the height of the material from the pin roll. The contact with the material maintained by the present invention overcomes the need for that maintenance. Second, in the prior art, the fixed gap is greatly affected by pin roll "runout", which is any variations in the concentricity of the pin roll imparted during fabrication. Prior art runout may be manifested in cyclical variation in the size of the holes perforated in the web as the height of the gap varied within each revolution of the pin roll, unless the pin roll body, journals, bearings and bearing seats are precisely machined. Third, the porosity in the prior art may increase during a continuous production resulting from the decrease in the gap brought about by the thermal expansion of the horn, since forced air cooling is not provided in the prior art.

The horn 1 has a tendency to heat while web perforations are being created. In one embodiment, an application of a forced stream of air to the tip of the horn 1 by an air stream generator 17 cools the horn. In a preferred embodiment, the air stream generator 17 is a fan or a compressed air device. This cooling prevents premature horn failure due to heat induced cracking of the horn. Additionally, cooling limits, and preferably prevents, the increase in air porosity with time from the start-up of the perforating system to the shut-down of the perforating system.

The web 2 passes between the ultrasonic horn 1 and pin roll 6, while conforming to the circumference of the pin roll 6, and, while still conforming to the pin roll 6, passes between the pin roll 6 and the nip roll 5. The nip roll 5 may be a steel core covered with hard rubber or plastic of preferably 70 to 100 durometer, Shore A hardness scale. One or more air cylinders 4 is employed to load the nip roll 5 against the pin roll 6. The nip roll 5 contacts the pin roll 6 tangentially between 15 and 345 degrees around the circumference of the pin roll from the horn 1. The nip roll 5 nips the web against the pin roll 6 to prevent any slippage of the web 2 over the pin roll 6. Slippage seen in the prior art causes the perforated holes to be elongated instead of circular. Additionally, the nip roll 5 imparts a very smooth texture to carrier construction type webs. When the film or foam layer 22 is ultimately placed on the bandage user's skin and the carrier paper 23 is removed, the smooth texture of the web 2 is noticeable to the touch.

In one embodiment, after the nip roll 5 is no longer in contact with the web 2, the web 2 passes through an exit nip station. The exit nip station includes a driven nip roll 10 and a non-driven nip roll 16. Both rolls 10, 16 may be formed of rubber, or one may be formed of steel. In an embodiment wherein the driven nip roll 10 is formed of steel, the steel must be release coated. Release coatings are well known in the art. The driven nip roll 10 is driven by the pin roll drive motor 7 with a variable speed or drive transmission 11. The variable speed or drive transmission 11 may be adjusted via a hand wheel, providing a slight stretch or draw to the web 2, thereby eliminating any slack in the web 2 between the pin roll 6 and the driven nip roll 10. The preferred variable speed or drive transmission ratio is from about 1.01:1 to 2:1, and is dependent upon such factors as the material of the web 2 being perforated, the geometry of the pin pattern, and the desired amount of perforations.

One or more air cylinders 12 pneumatically load the non-driven nip roll 16 against the driven nip roll 10 and prevent the web 2 from slipping around the driven nip roll 10, in order to provide constant speed and uniform tension in the web 2. Tension in the web 2 is isolated between the pin roll 6 and the rewind roll (not shown). The web 2 enters the rewind roll after passing between the driven nip roll 10 and the non-driven nip roll 16. Preferably, the rewind tension is made to decrease as the diameter of the web 2 on the rewind roll increases.

Interliner Construction Web in the Pre-nip Path

Referring again to FIG. 1A, the web employs path 3. The web 3 is fed off a conventional unwind under controlled tension and is directed by idler roller **8*a* to the perforating station 18. The perforating station includes a driven pin roll 6, a pin roll drive motor 7, a nip roll 5, air cylinders 4 and 12, ultrasonic equipment 1, 13, 14, 15, a drive/nip roll 10, and a non-driven nip roll 16**.

In a preferred embodiment, the web exits one or more idle rollers **8*a* and is wound around the nip roll 5. The web 3 passes between the nip roll 5 and the pin roll 6, causing an impression of the pin pattern in the web 3, but preferably no holes are produced. The film or foam layer 31 is compressed, displaced or both at the top of each pin, causing a smaller thickness in the film or foam layer where the film or foam layer contacts the top of each pin, thereby requiring less ultrasonic energy to perforate the web 3 than a web 2** as described above.

Since the thickness of the film or foam layer 31 has been reduced by the pressing action of the nip roll 5, less ultrasonic energy is required to perforate the film or foam layer 31 in the web 3 to the same level of porosity as web 2 in the post-nip path. If the same amplitude and the same ultrasonic actuator pressure are set with web 3 in the pre-nip path as with web 2 in the post-nip path, then the perforating speed in the pre-nip path may be increased approximately twenty percent (20%) over the speed set for the web 2 in the post-nip path. Alternatively, if the speed of the web 3 in the pre-nip path is set to the same value as for web 2 in the post-nip path, then the porosity will be approximately ten to twenty percent (10–20%) greater than that obtained in the web 2 in the postnip path. This increase can be seen in FIG. 10 for webs having foam layers.

After the web 3 wraps around the nip roll 5, the web 3 conforms to the contour of the pin roll 6 circumference and passes between the pin roll 6 and the ultrasonic horn 1. The ultrasonic horn 1 perforates the film or foam layer 31.

The web 3 exits from the pin roll 6, and tension is set to separate the web 3 from the pin roll 6. For a web 3, with high tensile strength, such as 3 to 5 pli, and low stretch. The tension is set relatively high, resulting in little or no wrap of the web 2 on the pin roll 6 immediately following the contact point between the pin roll 6 and the ultrasonic horn 1. For a web 3, with lower tensile strength and higher stretch, the tension is set relatively low, such as 0.5 pli to 2.5 pli, resulting in a small amount of wrap of the web 3 on the pin roll 6 immediately after the ultrasonic horn 1.

In a preferred embodiment, after the pin roll 6 is no longer in contact with the web 3, the web 3 passes through the exit nip station in order to set the above mentioned tension.

Higher Production Requirements

The perforation system is preferably for use by webs 2, 3 having a width of up to six inches. This size web exiting the perforation system could be fed immediately to a single high-speed adhesive bandage maker upon exiting the perforation system. In this embodiment, the perforation system has the advantages of low capital cost, quick installation and quick start up time.

In another embodiment, the production of perforated webs 2, 3 can be increased by employing one or more ultrasonic systems across a wider web, for example 30 inches to 60 inches wide. Other processes, such as slitting, can be combined with ultrasonic perforation for savings in capital costs and production costs.

Figure 1B:
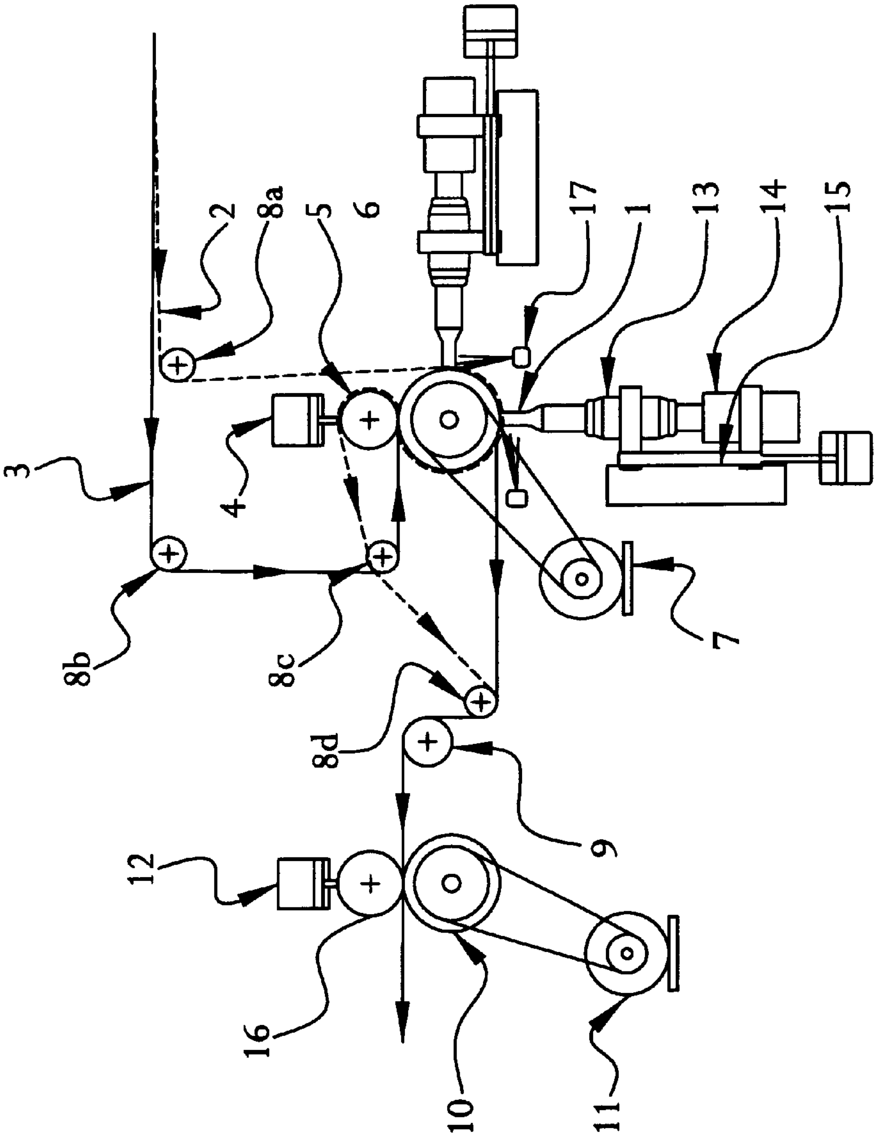
FIG. 1B shows one embodiment of the ultrasonic perforation process with the web path denoted for both the pre- and post- nip paths.

Referring now to FIG. 1B, the web (2) follows a similar path to that shown in FIG. 1A. The web 2 is directed by an idle roller **8*a* to the perforating station 18, where the web 2 passes between one or more ultrasonic horns 1 and the pin roll 6, the web 2 continues around the circumference of the pin roll 6, passes between the pin roll 6 and the nip roll 5, and is then directed by one or more pass rollers 8*c*, 8*d* to a tension sensing roller 9. The ultrasonic horns 1 are aligned so that each perforate a separate and distinct width of the web 2. Tension sensing roller 9 measures and controls the tension in the web 2 between the pin roll 6 and the driven exit nip roll 10. The exit nip drive motor 11 is preferably electronically regulated. The exit nip drive motor 11 will preferably follow the speed of the pin roll drive motor 7. The exit nip drive motor speed is responsive to the tension sensing roller 9, in order to maintain tension on the web 2. The web 2, upon exiting the driven exit nip roll 10**, is rewound onto a core, preferably cardboard, by a rewind of conventional design.

Also in FIG. 1B, the web 3 follows a similar path as that shown in FIG. 1A. The web 3 is directed by one or more idle rollers **8*b*, 8*c* to the perforating station 18, where the web 3 passes between the nip roll 5 and the pin roll 6, impressing the pin pattern into the web 3. The web 3 winds around the circumference of the pin roll 6 and then passes between the ultrasonic horn 1 and the pin roll 6, where it is perforated by one or more ultrasonic horns 1. The ultrasonic horns 1 are aligned so that each perforate a separate and distinct width of the web 3. The web 3 then separates from the pin roll 6, passes around pass roller 8*d*, and wraps around tension sensing roller 9. Tension sensing roller 9 measures and controls the tension in the web 3 between the pin roll 6 and the driven exit nip roll 10. The exit nip drive motor 11** is preferably electronically regulated.

FIG. 1B illustrates an embodiment of the present invention that includes two or more ultrasonic horns 1 in series. This embodiment offers increased throughput where each horn maintains the same energy level as is used in an embodiment including only one horn 1, and offers a decrease in horn energy necessary to maintain the same throughput as in an embodiment including only one horn 1. The embodiment of FIG. 1B offers an increase in throughput of up to 20%. For example, using a carrier PVC web, a speed of 200 ft/min can be achieved using one horn 1, with a target porosity of 30 cfm/sq.ft. Using the same carrier PVC web, a throughput of 240 ft/min can be achieved, at the same porosity, using at least two horns 1. However, throughput (speed) is strictly material dependent. For example, a foam web at the porosity of 30 cfm/sq.ft would have a throughput of 60–70 ft/min using one horn, but would still display the same 20% throughput increase in an embodiment including multiple horns 1. Further, as the number of horns 1 is increased, a corresponding increase in the circumference of the pin roll may be required to accommodate the additional horns 1.

Closed Loop Horn Temperature Control System

The perforation system may further include a closed loop temperature control system. In a preferred embodiment, a temperature sensor would be mounted on or in the ultrasonic horn 1, and the temperature of the horn would be input to a controller. The temperature sensor may be an infrared non-contact temperature sensor. The controller would control the air flow from the air stream generator 17 onto the ultrasonic horn 1 in order to maintain a pre-determined set temperature of the ultrasonic horn 1. In this manner, the ultrasonic horn 1 will not be heated and will not cause a variation in the position of the ultrasonic horn 1 relative to the pin roll 6. Further, the closed loop system allows the horn to heat up to temperature, and then maintains an even temperature, thereby insuring a more narrow porosity range throughout a production run.

Simulation Results

Figure 10:
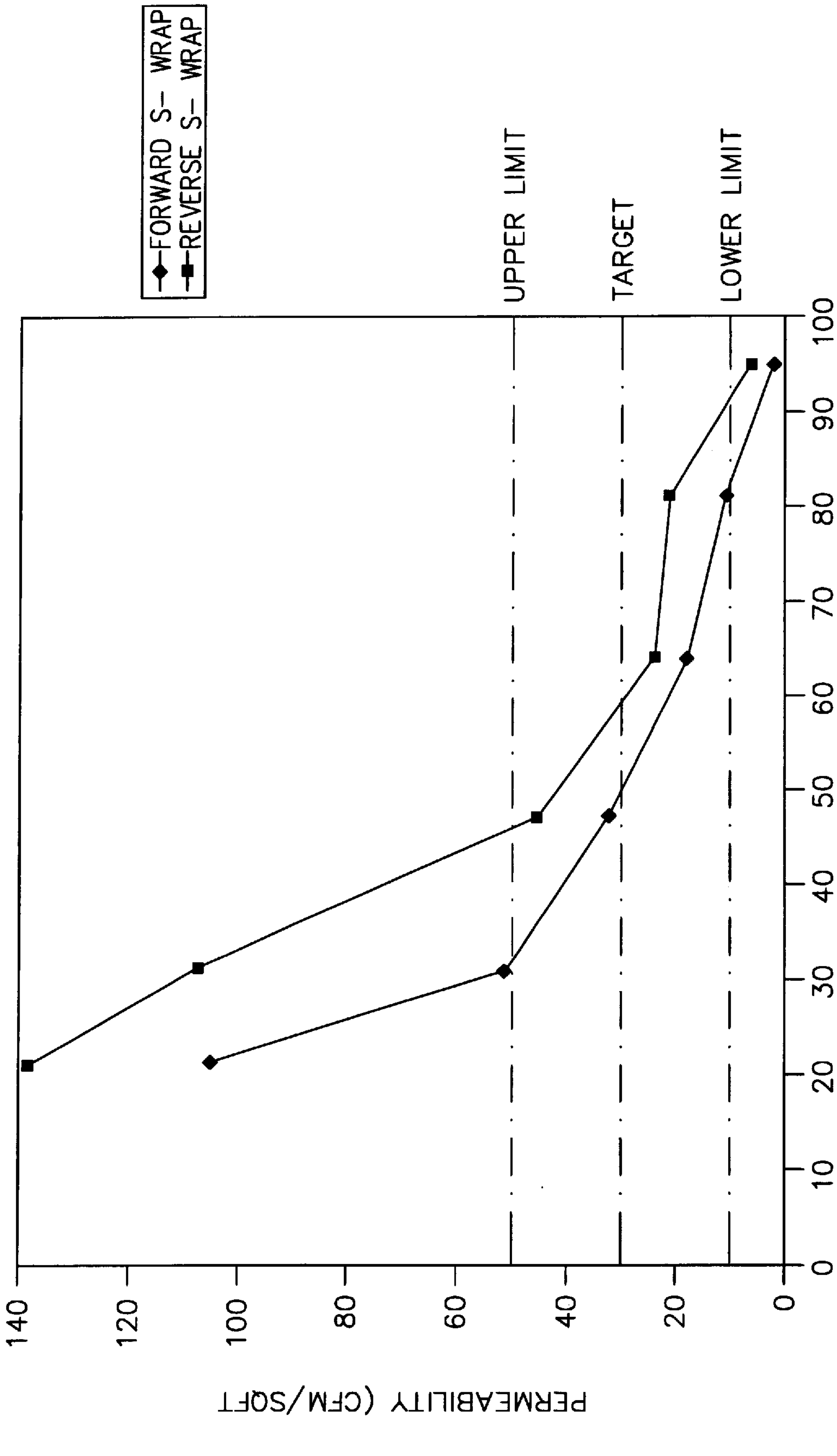
FIG. 10 displays a typical air permeability (or porosity) versus the pin roll speed for the ultrasonic perforation system.

FIG. 10 displays the air permeability, or porosity versus the pin roll speed for the ultrasonic perforation system. It is evident from the Figure that there is an increase in porosity for all given pin roll speeds where a pre-nip is used, versus an embodiment not using a prenip.

Figure 11:
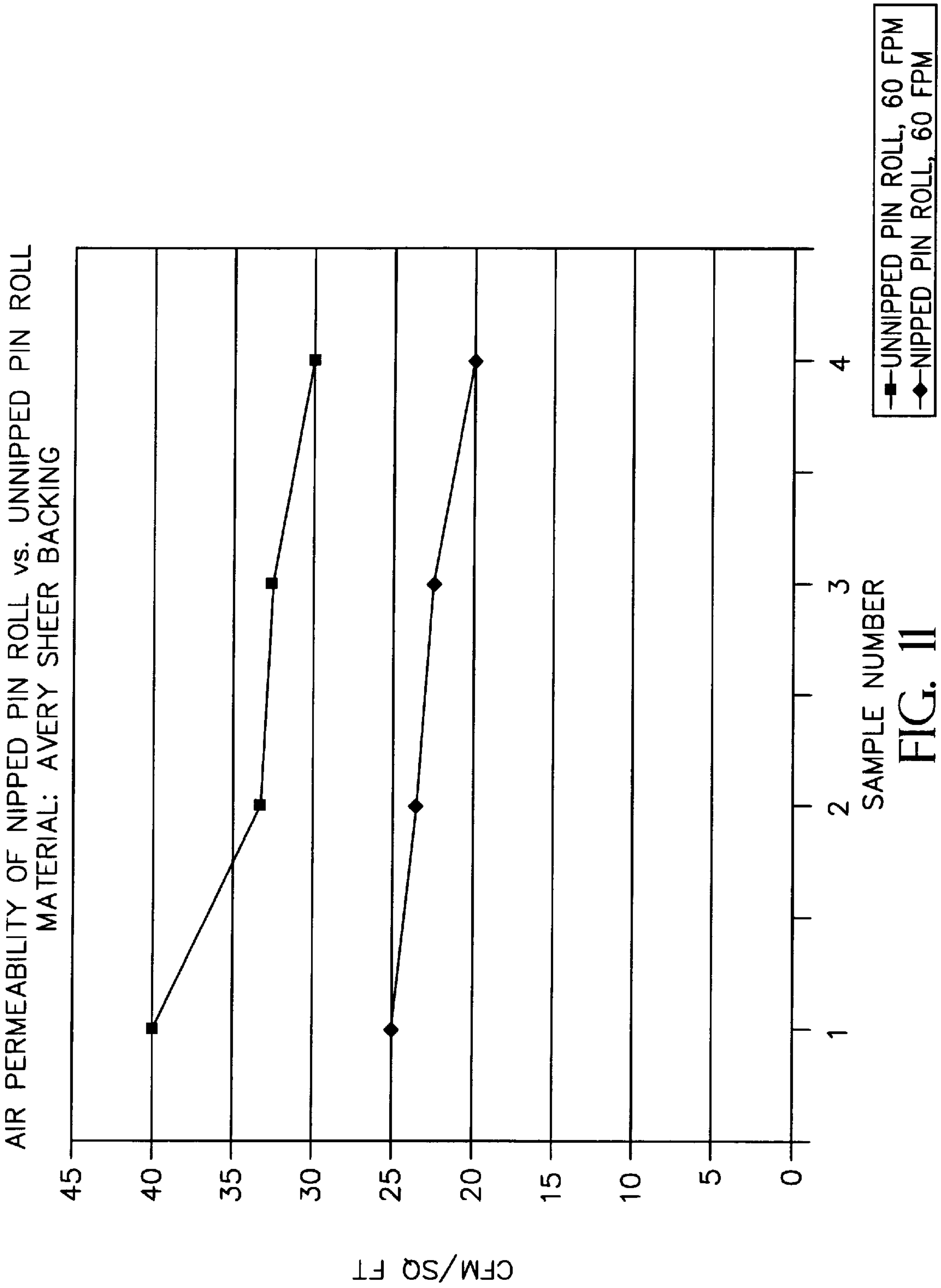
FIG. 11 displays the air permeability (or porosity) of material resulting from the use of the nipped and unnipped pin roll.

FIG. 11 displays the air permeability, or porosity, of material resulting from the use of the nipped and unnipped pin roll. It is evident from the Figure that there is an increase in air permeability where a nipped pin roll is used, versus an embodiment including an unnipped pin roll. FIG. 11 shows the increase in porosity of a interlined film when the pre-nip path 3 is employed versus when the web 2 does not contact the nip roll 5 before the ultrasonic horn 1 (the post-nip path).

Figure 12:
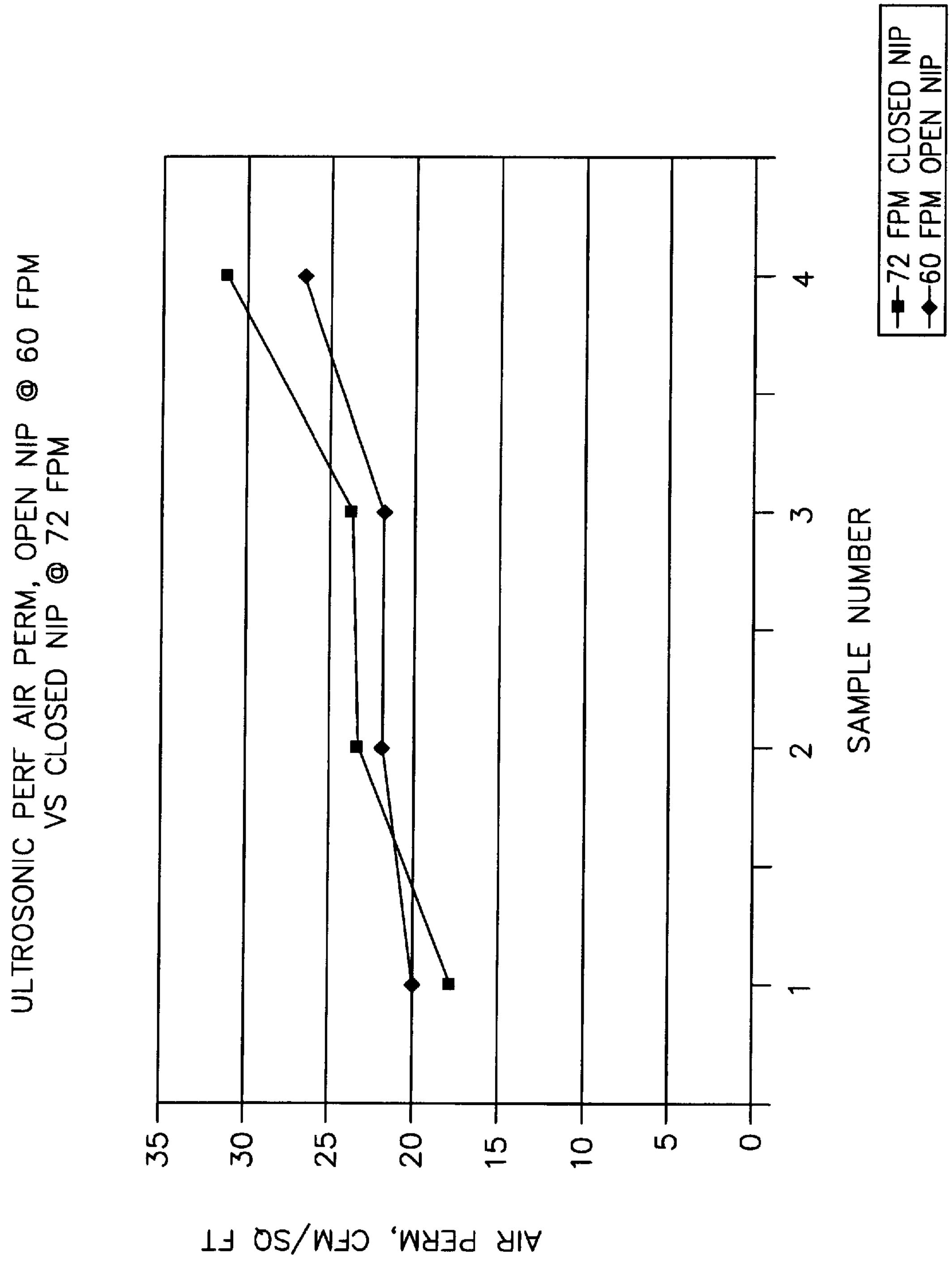
FIG. 12 displays the air permeability (or porosity) of material resulting from the use of the open nip and the closed nip, and as used herein, "open nip" means the nip roll does not contact the pin roll, and "closed nip" means the nip roll contacts the pin roll.

FIG. 12 displays the air permeability (or porosity) of material resulting from the use of the open nip and the closed nip. As used herein, "open nip" means the nip roll does not contact the pin roll, and "closed nip" means the nip roll contacts the pin roll. FIG. 12 illustrates the increase in speed at which a interliner film can be run in a pre-nip path to obtain the same porosity as a slower speed web in the post-nip path 2.

Those of ordinary skill in the art will recognize that many modifications and variations of the present invention may be implemented. The foregoing description and the following claims are intended to cover all such modifications and variations.

What is claimed is:

1. A method of performing an ultrasonic perforation, comprising:

providing a material web;

tensioning the web;

unwinding the web onto a pin roll;

passing the web on the pin roll under an ultrasonic emitter;

forcing the ultrasonic emitter into contact with the web using an actuator, wherein the force is imparted to the ultrasonic emitter and transferred only to the web, thereby forcing the web against the pin roll;

applying ultrasonic energy to the web from the ultrasonic emitter winding the web from the pin roll to an exit nip roll in tangential contact with the pin roll;

spooling the web off the exit nip roll.

2. The method of claim 1, wherein said providing a material web comprises layering a laminate on a carrier to form the material web.

3. The method of claim 1, further comprising exerting a nip force which urges the nip roll toward the pin roll.

4. The method of claim 1, further comprising driving the pin roll using a pin roll drive motor.

5. The method of claim 4, further comprising controlling the pin roll drive motor using an electronic variable speed drive system.

6. The method of claim 1, further comprising nipping the web after said applying and said winding and before said spooling.

7. The method of claim 6, further comprising:

sensing tension in the web using a tension sensing roller; and controlling tension in the web at said nipping based on said tension sensing.

8. The method of claim 1, further comprising rewinding the web after said spooling.

9. The method of claim 1, further comprising cooling the ultrasonic emitter.

10. The method of claim 9, further comprising controlling said cooling using a feedback controller to maintain a constant temperature of the ultrasonic emitter.

11. The method of claim 10, wherein said cooling comprises forcing air onto the ultrasonic emitter.

12. The method of claim 1, further comprising placing the nip roll between 15 and 345 degrees around the circumference of the pin roll from the ultrasonic emitter before said providing.

13. The method of claim 1, further comprising hardening the pin roll by applying a wear resistant release coating before said providing.

14. A method of performing an ultrasonic perforation, comprising:

(a) unwinding a material web and a carrier entwined with the web under controlled tension;

(b) defining two web paths, the first web path including a nip roll followed sequentially by a pin roll which tangentially contacts the nip roll, the second web path including the pin roll sequentially followed by the nip roll;

(c) passing the material web and the carrier along one of the web paths;

(d) contacting the material web with a plurality of pins on the pin roll;

(e) contacting the carrier with an ultrasonic emitter;

(f) forcing the ultrasonic emitter into contact the carrier using an actuator, which actuator exerts a force on the ultrasonic emitter that is transferred only to the material web, thereby forcing the material web into contact with the pins;

(g) applying to the carrier ultrasonic energy from the ultrasonic emitter;

(h) cooling the ultrasonic emitter;

(i) passing the material web through an exit nip station after steps (a) through (g); and (j) rewinding the material web.

15. The method of claim 14, further comprising, before step (c), choosing the first web path if an adhesive on the material web is contacting the carrier, and choosing the second web path if the adhesive is not contacting the carrier.

16. An ultrasonic system for perforating a tensioned web having a top surface and a bottom surface, comprising:

a pin roll, having a plurality of perforators thereon, which pinroll receives said tensioned web;

at least one ultrasonic emitter having an outlet that contacts said tensioned web and exerts a pressure on said tensioned web;

at least one actuator that forces said ultrasonic emitter toward said tensioned web and maintains contact between the outlet and said tensioned web, wherein the outlet exerts the pressure only on said tensioned web, thereby forcing said tensioned web against the perforators; and a nip roll that tangentially contacts said pin roll, which nip roll receives said web.

17. The ultrasonic perforator of claim 16, wherein said tensioned web is an extensible web having a continuous side and a non-continuous side, said tensioned web having an adhesive on either the top surface or the bottom surface, wherein the adhesive does not contact the outlet.

18. The ultrasonic perforator of claim 17, further comprising a carrier on which said tensioned web is laid.

19. The ultrasonic perforator of claim 18, wherein said tensioned web defines a web path, and wherein the adhesive is on the top surface and the carrier contacts the bottom surface, and wherein the web path extends around said pin roll to said nip roll.

20. The ultrasonic perforator of claim 18, wherein said tensioned web defines a web path, and wherein the adhesive is on the bottom surface and the carrier contacts the adhesive, and wherein the web path extends around said nip roll to said pin roll.

21. The ultrasonic perforator of claim 16, wherein said tensioned web is laminated.

22. The ultrasonic perforator of claim 16, wherein said tensioned web is a material selected from the group consisting of a film, a foam, a woven fabric, and a non-woven fabric.

23. The ultrasonic perforator of claim 16, wherein the tangency of the tangential contact is directly across a diameter of said pin roll from the outlet of said ultrasonic emitter.

24. The ultrasonic perforator of claim 16, wherein said pin roll is coated with a chrome carbide cermet.

25. The ultrasonic perforator of claim 16, further comprising at least one air cylinder which is placed to exert a nip force which urges said nip roll toward said pin roll.

26. The ultrasonic perforator of claim 16, further comprising a web source that provides said tensioned web and provides tension to said tensioned web.

27. The ultrasonic perforator of claim 16, wherein the perforators comprise a truncated conical projection engraved in the pin roll.

28. The ultrasonic perforator of claim 16, wherein the perforators comprise a truncated conical projection knurled in the pin roll.

29. The ultrasonic perforator of claim 27 or 28, wherein the perforators are approximately 0.025" in height, and wherein the perforators have a diameter in the range of approximately 0.005" to approximately 0.025".

30. The ultrasonic perforator of claim 29, wherein the height of the perforators is greater than a perpendicular measure from the top surface of the tensioned web to the bottom surface of the tensioned web.

31. The ultrasonic perforator of claim 16, wherein the pin roll has thereon between approximately 70 to approximately 300 pins per square inch.

32. The ultrasonic perforator of claim 16, further comprising a pin roll drive motor which drives said pin roll.

33. The ultrasonic perforator of claim 32, wherein said pin roll drive motor is controlled by an electronic variable speed drive system.

34. The ultrasonic perforator of claim 16, wherein said nip roll comprises a steel core covered with a rubber.

35. The ultrasonic perforator of claim 16, wherein said nip roll comprises a steel core covered with a plastic.

36. The ultrasonic perforator of claim 16, further comprising an exit nip station.

37. The ultrasonic perforator of claim 36, wherein said exit nip station comprises:

a driven exit nip;

a variable speed exit nip drive transmission connected to said driven exit nip;

a non-driven exit nip which tangentially contacts said driven exit nip;

at least one air cylinder proximate to said non-driven exit nip, which exerts air pressure on said non-driven exit nip, thereby urging said non-driven exit nip toward said driven exit nip.

38. The ultrasonic perforatore of claim 37, wherein one of either said driven exit nip or said non-driven exit nip comprises steel.

39. The ultrasonic perforator of claim 38, wherein said driven exit nip is formed of steel, and wherein said driven exit nip is release coated.

40. The ultrasonic perforator of claim 37, wherein at least one of said driven exit nip and said non-driven exit nip comprises rubber.

41. The ultrasonic perforator of claim 37, wherein said driven exit nip is driven by a pin roll drive motor.

42. The ultrasonic perforator of claim 37, further comprising a rewind station which receives said tensioned web from said exit nip station.

43. The ultrasonic perforator of claim 37, further comprising a tension sensing roller that senses and controls tension in said tensioned web at said exit nip station.

44. The ultrasonic perforator of claim 16, wherein said tensioned web is continuous along one length, and up to 6" along a second length.

45. The ultrasonic perforator of claim 16, further comprising a forced air source that directs forced air onto the outlet.

46. The ultrasonic perforator of claim 16, wherein the outlet is variably displaced from said pin roll, and wherein the variable displacement forms a variable gap between the outlet and said pin roll.

47. The ultrasonic perforator of claim 16, wherein said actuator is selected from the group consisting of an air actuator, a hydraulic actuator, and a spring actuator.

48. An ultrasonic system for perforating a tensioned web, comprising:

a pin roll, having a plurality of perforators thereon, which pinroll receives said tensioned web;

at least one ultrasonic emitter having an outlet that contacts said tensioned web and exerts a pressure on said tensioned web;

a forced air source that directs forced air onto the outlet; and a feedback controller that allows the outlet to reach a predetermined temperature, and then maintains that temperature by alternately activating and deactivating said forced air source.

49. The ultrasonic perforator of claim 48, further comprising at least one actuator that forces said ultrasonic emitter toward said tensioned web and maintains contact between the outlet and said tensioned web, wherein the outlet exerts the pressure only on said tensioned web, thereby forcing said tensioned web against the perforators.

50. The ultrasonic perforator of claim 48, wherein said forced air source is selected from the group consisting of a fan and a compressed air source.

51. The ultrasonic perforator of claim 48, wherein said tensioned web is laid on a carrier.

52. The ultrasonic perforator of claim 48, wherein said tensioned web is a material selected from the group consisting of a film, a foam, a woven fabric, and a non-woven fabric.

53. The ultrasonic perforator of claim 48, further comprising a web source that provides said tensioned web and provides tension to said tensioned web.

54. The ultrasonic perforator of claim 48, wherein the perforators comprise a truncated conical projection engraved in the pin roll.

55. The ultrasonic perforator of claim 48, wherein the perforators comprise a truncated conical projection knurled in the pin roll.

56. The ultrasonic perforator of claim 48, further comprising a pin roll drive motor which drives said pin roll.

57. The ultrasonic perforator of claim 48, wherein said pin roll is coated with a chrome carbide cermet.

58. The ultrasonic perforator of claim 48, further comprising a nip roll that tangentially contacts said pin roll, which nip roll receives said web.

59. The ultrasonic perforator of claim 48, wherein the outlet is variably displaced from said pin roll, and wherein the variable displacement forms a variable gap between the outlet and said pin roll.

60. The ultrasonic perforator of claim 48, wherein the outlet is a carbide tipped titanium horn.

61. The ultrasonic perforator of claim 48, wherein the pressure is in the range of approximately 20 lbs/inch to approximately 60 lbs/inch.

62. The ultrasonic perforator of claim 48, wherein the outlet has an output, the output having an adjustable amplitude, a maximum power in the range of 2000 to 2500 Watts, and a frequency of approximately 20 kHz.

63. The ultrasonic perforator of claim 48, wherein said pin roll is formed of unhardened steel and coated with a chrome carbide cermet.

64. The ultrasonic perforator of claim 48, further comprising a web source that provides said tensioned web and provides tension to said tensioned web.

65. An ultrasonic system for perforating a tensioned web having a top surface and a bottom surface, comprising:

a pin roll, having a plurality of perforators thereon, which pinroll receives said tensioned web;

at least one means for providing ultrasonic energy to the tensioned web, wherein said means for providing contacts said tensioned web and exerts a pressure on said tensioned web;

at least one means for forcing said means for providing ultrasonic energy toward said tensioned web, which means for forcing maintains contact between said means for providing and said tensioned web, wherein said means for providing exerts the pressure only on said tensioned web, thereby forcing said tensioned web against the perforators; and means for nipping that tangentially contacts said pin roll, which means for nipping receives said web.

66. An ultrasonic system for perforating a tensioned web, comprising:

a pin roll, having a plurality of perforators thereon, which pinroll receives said tensioned web;

at least one means for providing ultrasonic energy that contacts said tensioned web and exerts a pressure on said tensioned web;

means for directing forced air onto said means for providing; and means for controlling said means for directing, wherein said means for controlling allows said means for providing to reach a predetermined temperature, and then maintains that temperature by alternately activating and deactivating said means for directing, the activating and deactivating being based on feedback of that temperature.

67. The ultrasonic system of claim 66, further comprising at least one actuator that forces said means for providing toward said tensioned web and maintains contact between said means for providing and said tensioned web, wherein said means for providing exerts the pressure only on said tensioned web, thereby forcing said tensioned web against the perforators.

* * * * *